United States Patent [19]

Mengelt

[11] Patent Number: 5,473,533
[45] Date of Patent: Dec. 5, 1995

[54] METHOD AND APPARATUS FOR EFFICIENT PHASE AND FREQUENCY COHERENCE LOCKING OPTIMIZED FOR DIGITAL SYSTEMS

[75] Inventor: Kevin R. Mengelt, Port Edwards, Wis.

[73] Assignee: Best Power Technology, Incorporated, Necedah, Wis.

[21] Appl. No.: 161,338

[22] Filed: Dec. 2, 1993

[51] Int. Cl.⁶ .................................................. G06F 19/00
[52] U.S. Cl. ............................ 364/152; 307/66; 364/483
[58] Field of Search ..................................... 364/148, 152, 364/153, 140, 141, 724.01, 707, 480, 481, 483, 492; 328/155; 307/64–68, 85–87; 331/1 A, 17, 25, DIG. 2

[56] References Cited

U.S. PATENT DOCUMENTS

| | | | |
|---|---|---|---|
| 4,475,047 | 10/1984 | Ebert, Jr. | 364/707 X |
| 4,584,659 | 4/1986 | Stikvoort | 364/724 |
| 4,771,250 | 9/1988 | Statman et al. | 331/17 |
| 5,021,679 | 6/1991 | Fairbanks et al. | 364/707 X |
| 5,229,651 | 7/1993 | Baxter, Jr. et al. | 307/66 |
| 5,285,374 | 2/1994 | Iijima | 364/483 X |
| 5,315,533 | 5/1994 | Stich et al. | 364/480 |
| 5,323,309 | 6/1994 | Taylor et al. | 364/184 |

OTHER PUBLICATIONS

Someshwar C. Gupta, "On Optimum Digital Phase–Locked Loops," IEEE Trans. Commun. Technol., vol. COM–16, pp. 340–344, Apr. 1968.

Jack K. Holmes, "Performance of a First–Order Transition Sampling Digital Phase–Locked Loop Using Random–Walk Models," IEEE Trans. Commun., vol. COM–20, pp. 119–131, Apr. 1972.

Holly C. Osborne, "Stability Analysis of an Nth Power Digital Phase–Locked Loop–Part I: First–Order DPLL," IEEE Trans. Commun., vol. COM–28, pp. 1343–1354, Aug. 1980.

Holly C. Osborne, "Stability Analysis of an Nth Power Digital Phase–Locked Loop–Part II: Second–and Third–Order DPLL's," IEEE Trans. Commun., vol. COM–28 pp. 1355–1364, Aug. 1980.

William C. Lindsey, et al., "A Survey of Digital Phase–Locked Loops," Proc. IEEE, vol. 69, pp. 410–431, Apr. 1981.

*Primary Examiner*—Joseph Ruggiero
*Attorney, Agent, or Firm*—Foley & Lardner

[57] ABSTRACT

Phase and frequency locking of a controlled signal to a reference signal is obtained in a digital phase locked loop using efficient computational procedures which are carried out rapidly with minimal computational burden on a digital processor. During each cycle of the controlled signal, the time difference between the periods and the phases of the reference signal and the controlled signal are measured. These measured variables determine the predicted changes of the period of the controlled signal to bring the controlled signal into phase and frequency lock with the reference. The change allowed in the period between each discrete cycle is constrained to be less than or equal to a selected maximum amount of time. The predicted changes of period are determined such that the direction and amount of change in period during at least the first discrete cycle is such that for subsequent changes in period, the change will be at the maximum allowed amount of time change, thereby minimizing the total time required to achieve phase and frequency lock. The next cycle of the controlled signal is then changed in accordance with the change determined in this manner, with recalculation of the predicted changes during each cycle of the controlled signal to allow tracking of changes in the reference signal. The reference signal can be AC line power provided to an uninterruptible power supply, which uses the controlled signal to control an inverter to supply AC power derived from a battery when the main AC power fails.

10 Claims, 5 Drawing Sheets

METHOD AND APPARATUS FOR EFFICIENT PHASE AND FREQUENCY COHERENCE LOCKING OPTIMIZED FOR DIGITAL SYSTEMS

FIELD OF THE INVENTION

This invention pertains generally to the field of methods and systems for obtaining phase and frequency lock and to systems such as uninterruptible power systems which utilize phase and frequency locking.

BACKGROUND OF THE INVENTION

A variety of electronic devices utilize phase and frequency locking systems, commonly called phase locked loops (PLL). In a conventional analog or continuous system phase locked loop, the output signal from a voltage controlled oscillator is subtracted at a summing junction from a reference input signal, and the difference is fed back, typically through a low pass filter, to the control input of the voltage controlled oscillator. The feedback loop serves to reduce the difference between the input signal and the output of the voltage controlled oscillator to zero and to cause the output of the oscillator to track the reference signal. The time required for the system to lock to a new reference signal, the stability of the phase locked loop, and its sensitivity to noise, depends on the dynamics of the loop. Analog phase locked loops have been extensively investigated and developed, and are in common use in communication systems.

More recently, digital phase locked loops (DPLL) have been developed in which all or part of the function of the loop is carried out in a digital computer, e.g., a dedicated microprocessor or a digital signal processor. One common approach to digital phase locked loops is to implement, through digital processing, essentially the same feedback loops which are carried out in an analog phase locked loop. However, a number of differences can exist between a digital or discrete system implementation of a phase locked loop and an analog implementation. For example, in some discrete systems the controlled output signal may be a square wave rather than a sine wave (the latter typically being the form of the input or reference signal). In such cases, phase and frequency lock is considered to occur when the zero crossings of the controlled signal correspond to the zero crossings of the sinusoidal input signal. If the controlled signal is a square wave or quasi-square wave, the phase and frequency of the controlled signal cannot be changed continuously (as could a continuously varying sinusoidal signal); rather, such a signal can only be changed discretely by changing the phase or frequency of a complete cycle, i.e., by changing the period between the zero crossings of the square wave cycle.

One field of application of phase and frequency locked loops, both analog and digital, is in uninterruptible power systems which provide backup power to a critical load if the main AC power system fails. A variety of configurations for uninterruptible power systems (UPS) have been developed. In some types of uninterruptible power systems, typically those used with single phase power, the UPS normally provides the main power system AC line power directly to the load without an intermediate rectification and inversion of the power. In the United States, the single phase line power is typically at 60 Hz and has a sinusoidal waveform. In other countries, particularly European countries, normal line power may be at 50 Hz. In these types of uninterruptible power systems, when the main line power fails, an inverter is turned on to provide power from a DC energy storage device, typically a battery, to provide output power which has a sinusoidal or quasi-sinusoidal waveform. Generally, the power consuming device is suited to use AC power at the same frequency as was supplied from the main power lines. Thus, the UPS must provide power at that frequency. In addition, to avoid momentary disruptions of the power supplied to a critical load when the main AC line power fails, it is desirable to switch over from the line power to backup power through the inverter as quickly as possible, preferably so rapidly that power is not interrupted to the load for half a cycle or less.

Very rapid line power failure detection techniques have been developed which can detect power failure and turn on the inverter to supply backup power to the load within a fraction of a cycle from a time that the power failure was detected. However, if the output power provided from the inverter does not match in frequency and phase the waveform of the AC line power at the time of failure, a substantial disruption or glitch will appear in the waveform of the power provided to the load. Thus, a UPS of this type typically has a local oscillator with a phase locked loop which locks to the frequency and phase of the incoming AC line power. When the line power fails, the local oscillator continues to provide its periodic output signal at the same phase and frequency as the input signal, and the output of the local oscillator can then be used to control an inverter to provide output power which has the same phase and frequency as the original line power.

Conversely, when AC line power is restored, it will be desirable to switch off the inverter and switch back to providing the AC line power to the load without a significant glitch in the waveform of the power supplied to the load. Thus, when AC line power again becomes available, such UPS systems typically lock the local oscillator onto the AC line power signal so that the output of the inverter and the AC line power are in synchrony at the time that the switchover is made between the inverter power and power from the main AC power lines.

It is generally desirable that the phase locked loop in the UPS (as well as in other applications of phase locked loops) lock on to the reference signal (e.g., 60 Hz line power) as quickly as possible. In addition, if there is a change in the phase or frequency of the reference signal, it is desirable that the phase locked loop respond to it and achieve phase and frequency coherence in the shortest achievable time to avoid the possibility of the AC line power being lost during a point in time when the local oscillator was not in phase and frequency coherence with the reference. Similarly, when AC line power is restored, it is generally desirable that the UPS be able to switch back to providing power from the main power system to the load as quickly as possible, an objective which is limited in part by the speed at which the phase locked loop can reestablish phase and frequency coherence with AC line power reference.

However, a limit may be imposed by the consuming equipment on the rate at which the phase and frequency of the local oscillator may be changed. For example, if power is being supplied by the inverter to a load under the control of the local oscillator, and line power again becomes available, if the local oscillator is changed too rapidly in phase or frequency to try to reach the phase and frequency of the power line waveform, an unacceptable distortion or glitch in the waveforms of the power supplied to the load may occur. Typically, this limitation is expressed as a maximum rate of change of frequency, or frequency "slew rate". Because of these limitations, the phase locked loops in UPS systems are essentially nonlinear, and are typically implemented as a digital phase locked loop utilizing a microprocessor. In such digital phase locked loops, the speed at which the loop can achieve phase and frequency coherence is limited first by the maximum rate of change constraint (e.g., slew rate), and second by the complexity of the signal processing itself. The second limitation may outweigh the first if, for example, the computations required consume more time as they are carried out in the microprocessor than would otherwise be required by the first limitation. As a simple example, if the local oscillator can be changed at discrete points in time corresponding to increments of the present period of the local oscillator, and if the computations required to calculate the change required in the frequency or phase of the local oscillator will require more than one period's worth of time, then the adjustment of the local oscillator will be slowed. Consequently, it would be desirable that the processing of the digital phase locked loop both efficiently control the change in the local oscillator and also that the control algorithm itself does not consume so much processor time that it slows down the adjustment process from what would otherwise be required, or interfere with other tasks performed by the microprocessor.

SUMMARY OF THE INVENTION

The present invention provides a method and apparatus for phase and frequency locking which achieves rapid locking of the controlled signal to the reference signal, while being substantially constrained to a maximum rate of change of the controlled signal. The phase and frequency coherence loop may be implemented within a digital processor using a simple, efficient computational procedure which can be carried out rapidly to allow computations on relatively rapidly varying signals, and with a minimal computational burden on the processor.

In carrying out phase and frequency coherence locking in accordance with the invention, the time difference between the period of the reference signal and the period of the controlled signal is measured during each cycle of the controlled signal, for example, at the end of a cycle of the controlled signal, and the time difference between the phases (e.g., the positive zero crossing point) of the reference signal and the controlled signal is also measured. These measured variables determine predicted changes of the period of the controlled signal, which are to occur during each discrete cycle of the controlled signal, which would bring the controlled signal into phase and frequency lock with the reference. The rate of change of the controlled signal is constrained so that each change of period of the controlled signal, occurring during each discrete cycle of the controlled signal, is less than or equal to a selected maximum amount of time. The predicted changes of period are determined such that the direction and amount of change in period during at least the first discrete cycle at which the period is changed is selected such that for subsequent predicted changes in period the change in period will be at the maximum allowed amount of time change, thereby minimizing the total time required to achieve phase and frequency lock subject to the selected constraint of maximum time change in period per cycle. The period of the next cycle of the controlled signal is then changed in accordance with the predicted change for the next cycle determined in this manner, with recalculation of the predicted changes occurring at each cycle of the controlled signal to allow tracking of changes in the reference signal. The predicted changes are determined by calculating the time difference (predicted "phase") between the signals that would occur if the two signals were brought into frequency lock at the maximum rate of change at each cycle. The predicted change of period for the next cycle is then determined which would cause the predicted phase to be zero at frequency lock (subject to discrete system limitations) if subsequent changes were at the maximum rate.

By constraining the system to a maximum amount of time that the period of each cycle can change between adjacent cycles, the performance of the overall system is substantially constrained to a maximum rate of change of frequency where the reference signal and the controlled signal are relatively near to each other in frequency, as is typically the case where the reference signal is a 60 Hz power line signal. The constraint of a maximum amount of time that the period can change from cycle to cycle enables a very efficient computational procedure to be implemented in the digital processor to carry out the phase and frequency coherence locking. This computational procedure takes up a relatively small amount of digital processor time, so that other tasks being performed by the processor can be carried out without interference.

The digital phase locking system of the present invention is robust and relatively immune to disturbances. For example, if the period or phase of the reference signal changes during the time that the procedure is being carried out, the system can self-adjust to track a changed reference signal as the new phase and frequency target. The magnitude of the change of the reference signal may be small or large, may occur at any time, and may be frequency (period), and/or phase related. Upon a change of any of these attributes in the reference signal, the process within the microprocessor will immediately attempt to lock with the new signal, using a procedure that predicts future phase/frequency relationships between the controlled signal and the external reference. The ability of the microprocessor to predict in advance the necessary conditions for simultaneous frequency and phase coherence yields the fastest achievable lock time. By always slewing at the maximum possible rate, while making the corrections within the constraints of the system, lock will take place in the shortest achievable time. In this manner, the invention can adapt to variations in the reference signal as a function of time to remain on a optimum sequence to achieve phase and frequency lock with the reference. An uninterruptible power supply carrying out the invention can rapidly lock its internal controlled signal generator to the AC power line power to allow smooth transition from the power line to back-up power through an inverter, and vice versa.

Further objects, features and advantages of the invention will be apparent from the following detailed description when taken in conjunction with the accompanying drawings.

DETAILED DESCRIPTION OF THE INVENTION

Figure 1:
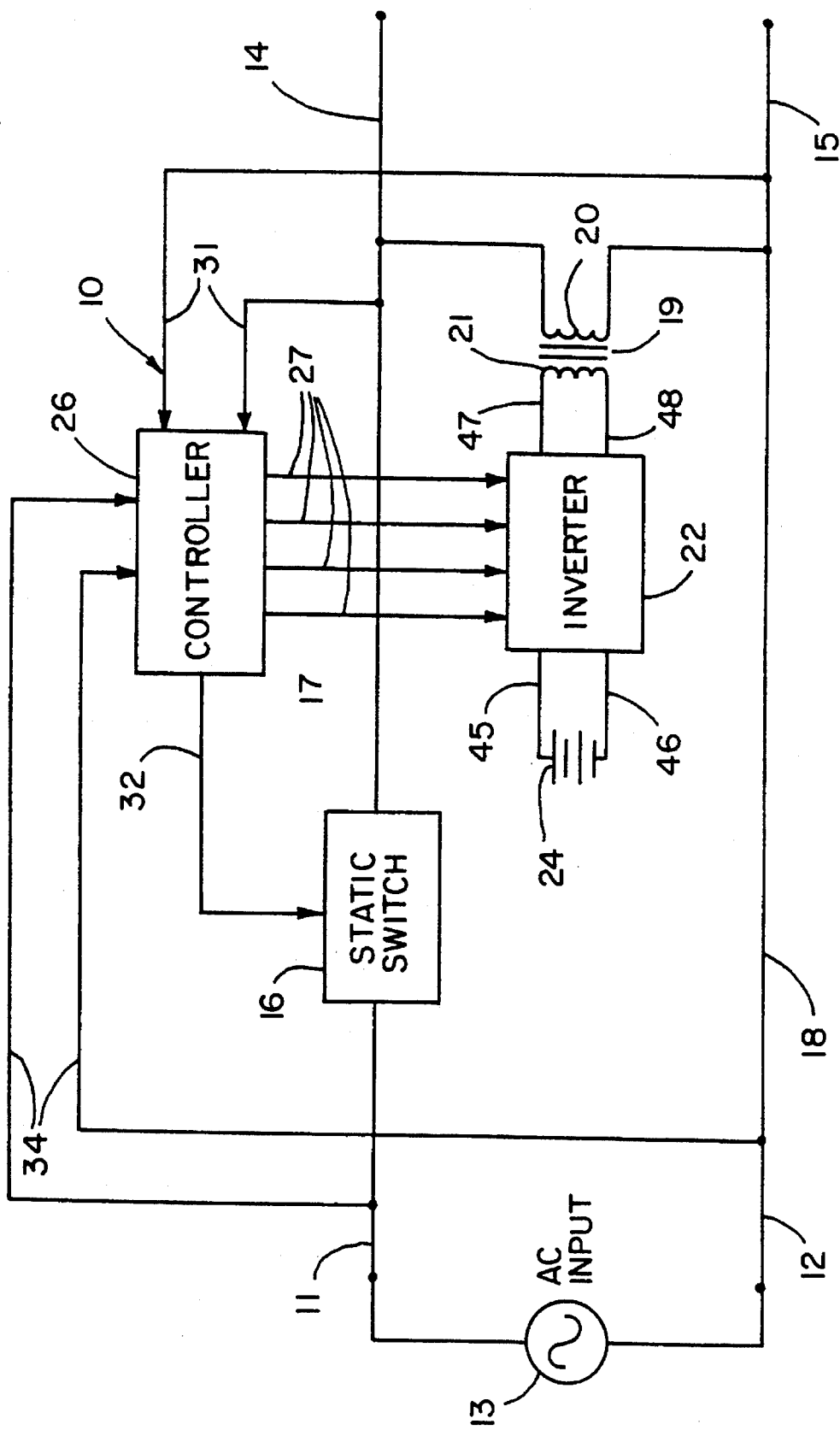
FIG. 1 is a block diagram of an exemplary uninterruptible power system in which the present invention may be implemented.

With reference to the drawings, a schematic block diagram of an illustrative backup or uninterruptible power system which utilizes phase and frequency locking in accordance with the present invention is shown generally at 10 in FIG. 1. It should be understood that the backup power system 10 is shown for purposes of illustration only, and the present invention may be incorporated in any other backup uninterruptible power system (UPS) requiring phase and frequency locking, as well as in other systems which require phase locked loops. The backup power system 10 receives AC input power at input terminals 11 and 12 from the main AC power source 13, e.g., a commercial power grid, and delivers AC output power at output terminals 14 and 15 to a critical load (not shown), for example, a computer. A static switch 16 is connected in an input power path line 17 which connects the input terminal 11 to the ouput terminal 14, while a line 18 directly connects the input terminal 12 to the output terminal 15. A main power transformer 19 has its secondary 20 connected between the power lines 17 and 18 and its primary 21 connected to an inverter 22. The inverter 22 receives DC voltage from a battery 24 on lines 45 and 46 and, under the control of a controller 26, delivers AC output power on lines 47 and 48 to the primary 21 of the transformer 19 to provide higher voltage AC power from the secondary 20 to the output terminals 14 and 15. The controller 26 provides control signals on control lines 27 to the inverter, and may receive signals on lines 31 connected to provide the controller with the output voltage across the output terminals 14 and 15. The controller may also receive signals on lines 34 connected to provide the controller with the voltage across the input lines 11 and 12. The controller 26 also provides a control signal on a line 32 to the static switch 16 to open and close the switch as appropriate. The inverter 22 may be of various designs, e.g., standard bridges of static switches, and the controller 26 and the static switch 16 may be of standard contruction, with many types well known in the art of standby and uninterruptible power systems. An example of a back-up uninterruptible power system in which the present invention may be incorporated is shown in U.S. patent application Ser. No. 07/702,733, filed May 17, 1991, now U.S. Pat. No. 5,315,533, and U.S. Pat. No. 5,229,651, issued Jul. 20, 1993, which are incorporated herein by reference.

In operation, when adequate AC power is available on the input terminals 11 and 12 from the source 13, the static switch 16 is closed and the AC input power from the terminals 11 and 12 is directly connected to the output terminals 14 and 15. The controller 26 monitors the input voltage across the lines 11 and 12 and receives this voltage on the lines 34. Upon determining that a failure of line power has occurred at the input terminals 11 and 12, which may be determined in any desired way known in the art, for example, as set forth in U.S. Pat. No. 5,229,651, the controller 26 provides a control signal on the line 32 to open the static switch 16 to disconnect the terminal 11 from the terminal 14. If desired, an additional relay may be incorporated in the line 17 to fully isolate the terminal 11 from the terminal 14, and mechanical switches or static switches may be incorporated in the line 18 to open that line also. At the time the static switch 16 is opened, the controller provides control signals on the lines 27 to the inverter 22 to turn it on to invert the voltage provided from the battery 24 into AC voltage applied to the primary 21 of the transformer 19, thereby providing AC output power at the output terminals 14 and 15 for the duration of the main AC power line failure.

When the controller 26 determines that adequate AC line power has been restored to the terminals 11 and 12, the controller turns off the inverter 22 and closes the static switch 16 to again connect the input power from the input terminals 11 and 12 to the output terminals 14 and 15. Charging of the battery 24 may be carried out in a conventional manner, for example by back charging through the inverter 22 or by using a separate charger (not shown) connected to the power lines 11 and 12. In accordance with the invention, the phase and frequency of the back-up AC power from the inverter follows a controlled signal from a controlled signal generator within the controller 26 which is synchronized to the AC line power.

Figure 2:
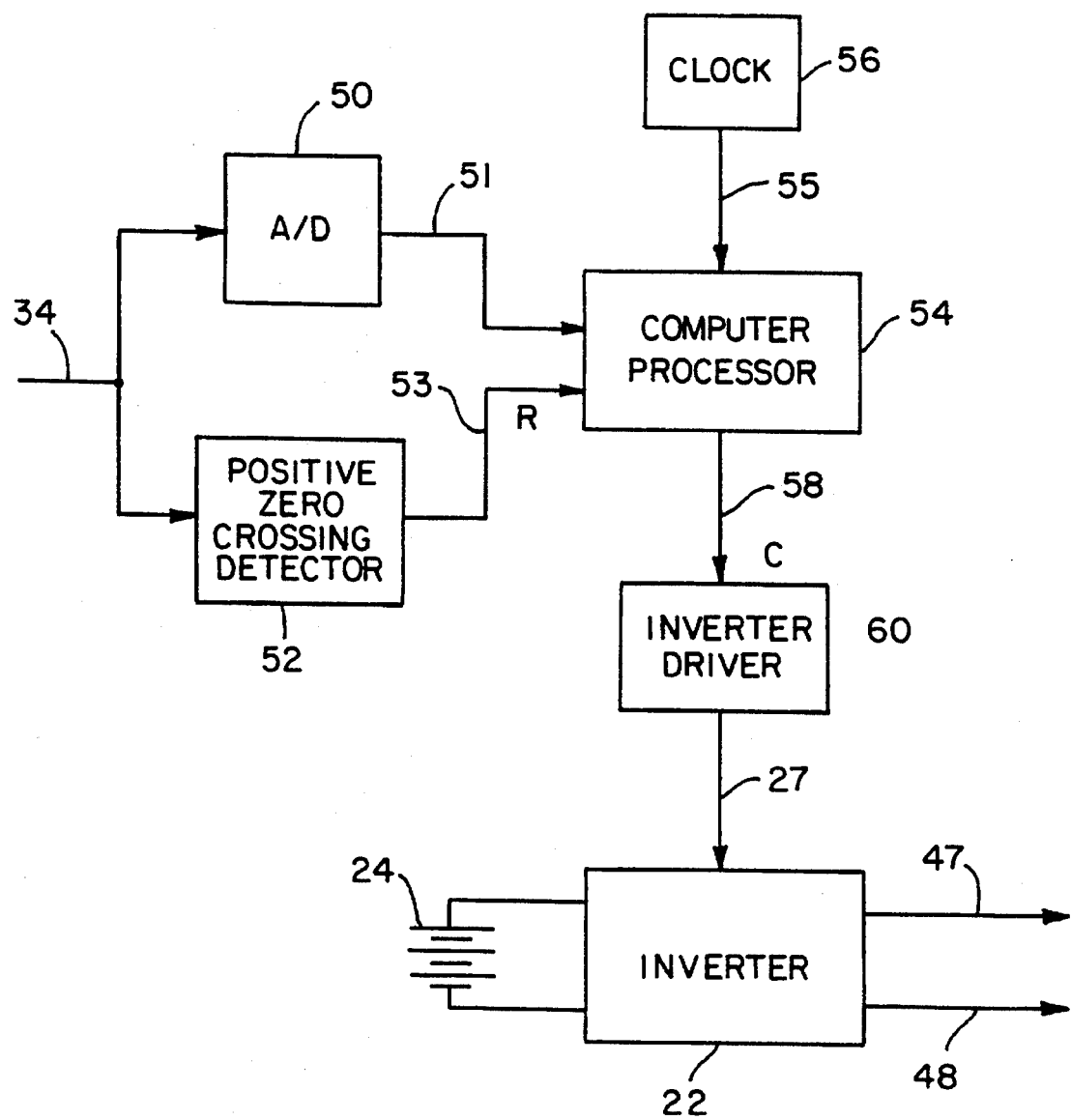
FIG. 2 is a simplified block diagram for the control components of an exemplary uninterruptible power system.

A simplified block diagram of the manner in which the controller carries out the control function, providing control signals to the inverter which are synchronized to the AC input power on the input lines 11 and 12, is shown in FIG. 2. The voltage signal on the lines 34 may be provided to an analog-to-digital converter 50 which provides digital output data on lines 51 to a computer processor 54. The voltage signal on the lines 34 is also provided to a positive zero crossing detector 52, which provides an output signal on a line 53 to the processor 54 when the voltage on the lines 34 crosses zero moving in a positive direction. The processor 54 may be any of various commercially available microprocessors and microcomputers (sometimes referred to herein as central processing unit or CPU) adapted for digital signal processing and the programmable control of equipment. For utilization in an exemplary uninterruptible power system, suitable microprocessors include the Siemens 80C166 or the Mitsubishi 37702. The processor 54 is provided with precisely timed clock pulses on a line 55 from a clock 56, which may be a crystal controlled oscillator incorporating suitable frequency division circuits to provide stable clock pulses at a desired frequency. The processor 54 provides an output signal on a line 58 constituting the controlled signal "C" which is to be synchronized in frequency and phase to the reference signal "R" on the line 53. The signal on the line 58 may take the form of a series of pulses which are provided to an inverter driver 60. The inverter driver 60 provides the inverter firing signals on lines 27 to control the switching of the switching devices within the inverter 22 in a conventional manner.

In accordance with the present invention, the computer processor 54 utilizes the reference signal R and the timing pulses from the clock 56 to lock the phase and frequency of the output signal C in a short amount of time using a minimum of computer processing time. The processing is robust and can readily respond to changes in the reference signal to allow tracking of a time varying reference. In accordance with the invention, it has been found that by constraining the system to a maximum amount of time difference that the period of each cycle can change between discrete cycles, tracking of the reference signal can be accomplished with simple processing steps which do not require extensive computations by the computer, which can be carried out quite quickly, and which do not interfere with other tasks being performed by the processor.

Predicted changes of period of the controlled signal are determined by calculating the time difference (predicted phase) that would occur between the reference and controlled signals if they were brought into frequency lock at the maximum amount of change of period per cycle. This time difference would, for example, correspond to the amount of time between the positive zero crossings or the leading edges of the two signals. A calculation is then made of the amount of the change of period of at least the next cycle of the controlled signal that would be required to cause the time difference (predicted phase) to be zero if subsequent changes in period at each cycle of the controlled signal were carried out at the maximum rate. The period of the next cycle of the controlled signal is then changed by the predicted amount (if that amount is less than or equal to the maximum change constraint, and if greater, at the maximum amount), and the process is repeated until phase and frequency lock are obtained, with the changes between cycles generally occurring at the maximum allowed rate. In a discrete system, changes in period can only occur discretely, once per cycle, and thus when the period difference becomes less than the maximum rate, a cycle or two of the controlled signal may be changed at substantially less than the maximum rate to reach phase and frequency lock.

A derivation of the CPU processing steps for carrying out the present invention is given below. For convenience, each of the variables is provided with two notations, a short notation which is used in the various algebraic expressions that are derived, and an expanded notation more descriptive of the purpose of each variable and more suited to use in programming the processor 54.

Defined Variables:

| | |
|---|---|
| ExtPeriod $\equiv E_p =$ | Number of counts between external events/interrupts (e.g., positive zero crossing of the signal R). A count-up timer measures clock counts between events. |
| Phase $\equiv P =$ | Number of timer counts of a count-up timer between external events (e.g., positive zero crossing of signal R) and CPU events (e.g., positive zero crossings of signal C). |
| $P_o =$ | Initial phase P in timer counts (i.e., a measure of time). |
| CPUPeriod $\equiv C_p =$ | CPU period reference. A count-down timer is loaded with this value. Higher counts correspond to lower frequencies. This represents the period of the controlled signal C. |
| MaxSlew $\equiv M_s =$ | Maximum rate at which $C_p$ may change. This is the maximum count (a measure of an amount of time) that may be subtracted from or added to $C_p$ in one cycle (e.g., at each time the count-down timer for $C_p$ goes to zero). |

Calculated Variables:

| | |
|---|---|
| PeriodDiff $\equiv P_D =$ | Magnitude of difference between ExtPeriod and CPUPeriod measured in timer counts. I.e., $P_D = \mid E_p - C_p \mid$ |
| FreqDir $\equiv D_F =$ | Direction in which to slew. If $E_p > C_p$, then $D_F = +1$ If $E_p \leq C_p$, then $D_F = -1$ |
| FreqLockTime $\equiv L_T =$ | Minimum time to achieve frequency lock. $L_T = P_D/M_s$ This is the minimum number of cycles in which frequency lock could be obtained. |
| FLTInt $\equiv L_{TI} =$ | Integer part of $L_T$. |
| FLTRem $\equiv L_{TR} =$ | Remainder I.e., $L_T = L_{TI} + L_{TR}/M_s$ |
| PeriodSlew $\equiv P_{sl} =$ | Number of counts to add to or subtract from $C_p$ to obtain frequency lock only. $P_{sl} = D_F \cdot P_D$ if $P_{sl} < M_s$, otherwise $P_{sl} = M_s$. |

-continued

| | |
|---|---|
| PhaseAccum $\equiv P_A =$ | Total phase shift of CPU reference C that would occur compared to line reference R if $C_p$ were changed by $M_s$ every cycle to achieve frequency lock. |

$P_A$ may be determined assuming an initial value of $P_D$. If $P_D$ is reduced by $M_S$ every cycle until $P_D$ is zero, the total $P_A$ introduced between the signals is:

$$\begin{aligned}
P_A &= (P_D - 0 \cdot M_S) \\
&+ (P_D - 1 \cdot M_S) \\
&+ (P_D - 2 \cdot M_S) \\
&+ (P_D - 3 \cdot M_S) \\
&+ \ldots \\
&+ (P_D - (L_{TI} - 1) M_S) \\
&+ (P_D - L_{TI} M_S) \\
&+ L_{TR}
\end{aligned}$$

This formula (ignoring $L_{TR}$) can be reduced to:

$$P_A = -D_F[P_D(L_{TI}+1) - M_S(L_{TI}+1)L_{TI}/2]$$

where $D_F$ determines the direction of $P_A$.

An equivalent alternative formula is:

$$P_A = -D_F[M_S(L_{TI}+1) \bullet L_{TI}/2 + L_{TR}(L_{TI}+1)]$$

PredictPhase$\equiv P_P =$The predicted phase (in number of counts) between the reference signal R and the controlled signal C if frequency lock were to occur at the maximum allowable slew rate, without regard to phase lock.

$P_P$ is calculated assuming an initial measured phase $P_O$, a maximum slew rate of $M_S$, and that the maximum slew rate of $M_S$ is used to achieve frequency lock without regard to phase lock. PredictPhase $P_P$ is determined as:

$$P_P = (P_O + P_A) \bmod E_P$$

where "Mod" is the modulo operation—Modulo $E_P$—on the sum $(P_O + P_A)$, which accounts for the possibility that $(P_O + P_A)$ may be greater than $E_P$.

PhaseSlew$\equiv P_S =$Number of counts to add to or subtract from the CPU reference counter so that the controlled signal will thereafter be changed at the maximum slew rate until frequency and phase lock occurs. $P_S$ may exceed $M_S$ in magnitude.

By calculating the future phase that will occur if we attempt to achieve lock at the maximum possible rate, we may determine the potential error and incorporate an appropriate adjustment in the trajectory of the solution. The future predicted phase allows the necessary adjustment in the locking process to assure that frequency and phase locking occur simultaneously. This feature assures that phase lock is achieved in the shortest time. To determine PhaseSlew ($P_S$), it is noted that $P_A$ was calculated above assuming that slewing took place at the maximum allowable rate. If $P_A$ is determined by slewing during the first step only by an unknown amount (labeled $P_S$), and then slewing toward frequency lock at the maximum slew rate:

$$P_A = [(L_{TI} - 0) M_S] + L_{TR} + P_S$$
$$+ [(L_{TI} - 1) M_S] + L_{TR} + P_S$$
$$+ [(L_{TI} - 2) M_S] + L_{TR} + P_S$$
$$+ \ldots$$
$$+ \ldots$$
$$+ 2 \cdot M_S + L_{TR} + P_S$$
$$+ 1 \cdot M_S + L_{TR} + P_S$$
$$+ 0 \cdot M_S + L_{TR} + P_S$$

It is seen that changing the first step only by the amount of $P_S$ has a cumulative effect on subsequent steps. Thus, a relatively small change in the present value of $C_P$ can change the final value by a large amount. The formula for $P_A$ may be simplified to:

$$P_A = -D_F \bullet [M_S(L_{TI}+1) \bullet L_{TI}/2 + (L_{TR}+P_S) \bullet (L_{TI}+1)]$$

It is seen that this formula is the same as that given above for $P_A$ with the additional factor $$-D_F \bullet (L_{TI}+1) P_S$$

The value of $P_P$ will also be changed by a similar amount. Thus, by selecting a proper value for $P_S$ at the initial point in time, the predicted phase $P_P$ between the reference signal and the controlled signal from the CPU can be selected to be a desired value (e.g., to be zero).

In particular, if $$P_S = -D_F \bullet P_P/(L_{TI}+1),$$

a change is made in the period of the controlled signal at the initial cycle which will be sufficient to cause the future predicted phase $P_P$ to be zero. Thus, it is typically possible to change the first cycle of the controlled signal by some amount less than $M_S$ and then slew at the maximum allowable rate to achieve a simultaneous frequency and phase lock.

TotalSlew=$T_S$=Total number of counts to add to or subtract from the CPU reference counter at each cycle required to obtain frequency and phase lock. This number cannot exceed $M_S$.

$$T_S = P_{s1} + P_s, \text{ if } (P_{s1} + P_s) \leq M_S$$

Otherwise, $T_S = M_S$.

In summary, phase and frequency locking is carried out by the apparatus of the invention by measuring the time difference in the periods of the reference signal R and the controller signal C at each cycle of the controlled signal, measuring the difference in phase between the reference signal R and the controlled signal C at each cycle, given a selected maximum amount of time that the period of the controlled signal is allowed to change between cycles of the controlled signal ($M_s$ corresponds to an amount of time), determining predicted changes to bring the controlled signal C into phase and frequency lock with the reference signal R such that the direction and amount of change in the period of the controlled signal during at least the first cycle at which the period is changed is selected such that for subsequent changes in period of the controlled signal to bring it into phase and frequency lock, the change in period will be at the maximum amount of time that can be changed per cycle, and then changing the period of the controlled signal in accordance with the predicted change so determined. The predicted change is preferably determined such that $T_s = P_{s1} + P_s$ at the next cycle if $(P_{s1} + P_s) \leq M_s$ (and $T_s = M_s$ otherwise), and generally then $T_s = M_s$ for all subsequent cycles until phase and frequency lock is obtained, where $P_{s1}$ and $P_s$ are determined as set forth above.

If the reference signal changes in frequency or phase at any time, the predicted phase $P_P$ as computed by the microprocessor at the next cycle will be non-zero. As a result, a non-zero correction factor at the maximum slew rate is applied to the controlled signal, such that period changes of the controlled signal will take place at the maximum allowable slew rate.

Figure 3:
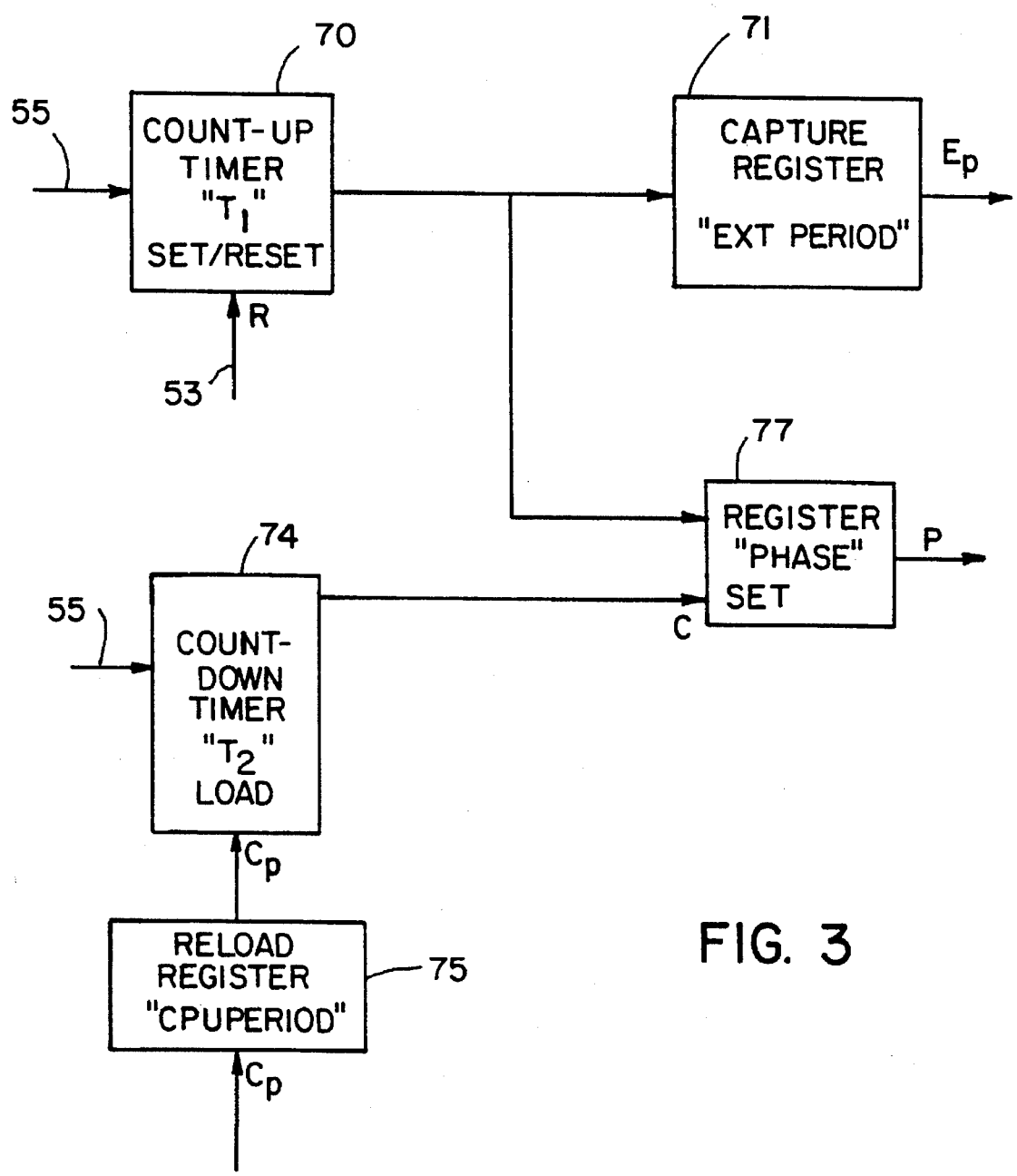
FIG. 3 is a block diagram showing an exemplary implementation of the phase and frequency locking system of the present invention.

To implement the control processing in accordance with the invention, the functional components within the processor 54 which constitute the generator for the controlled signal C are described below with reference to FIG. 3.

A timer 70 is required to measure the period of external events (the reference signal) to which the controlled signal is to be locked. The timer 70 within the processor 54 is typically an up-counter and is referred to below as $T_1$ with respect to the computer processing steps.

A capture register 71 is required to store the measured period $E_P$ from the timer 70. Upon the occurrence of an external event, the timer 70 value is stored to this location for later usage. The capture register may typically be a RAM location within the processor and is referred to below as "ExtPeriod".

A timer 74 is required that generates the CPU time base. The timer is typically a down counter within the microprocessor, and is referred to below as timer $T_2$.

A reload register 75 is required to initialize the CPU time base $C_P$. When the timer 74 reaches zero, it loads the value contained in the reload register 75 and proceeds to count down. The reload register 75 is typically a RAM location within the processor and is referred to below as "CPUPeriod".

A register 77 is required to store the phase between the CPU generated reference C and the external reference. When the timer 74 reaches zero, the timer 70 count is stored to this location. The register 77 is typically a RAM location within the processor, and is referred to below as "Phase".

As described below, registers are also required to store various quantities computed from the timers 70 and 74 and the registers 71 and 77. These registers are typically RAM locations within the processor 54.

Figures 4, 5:
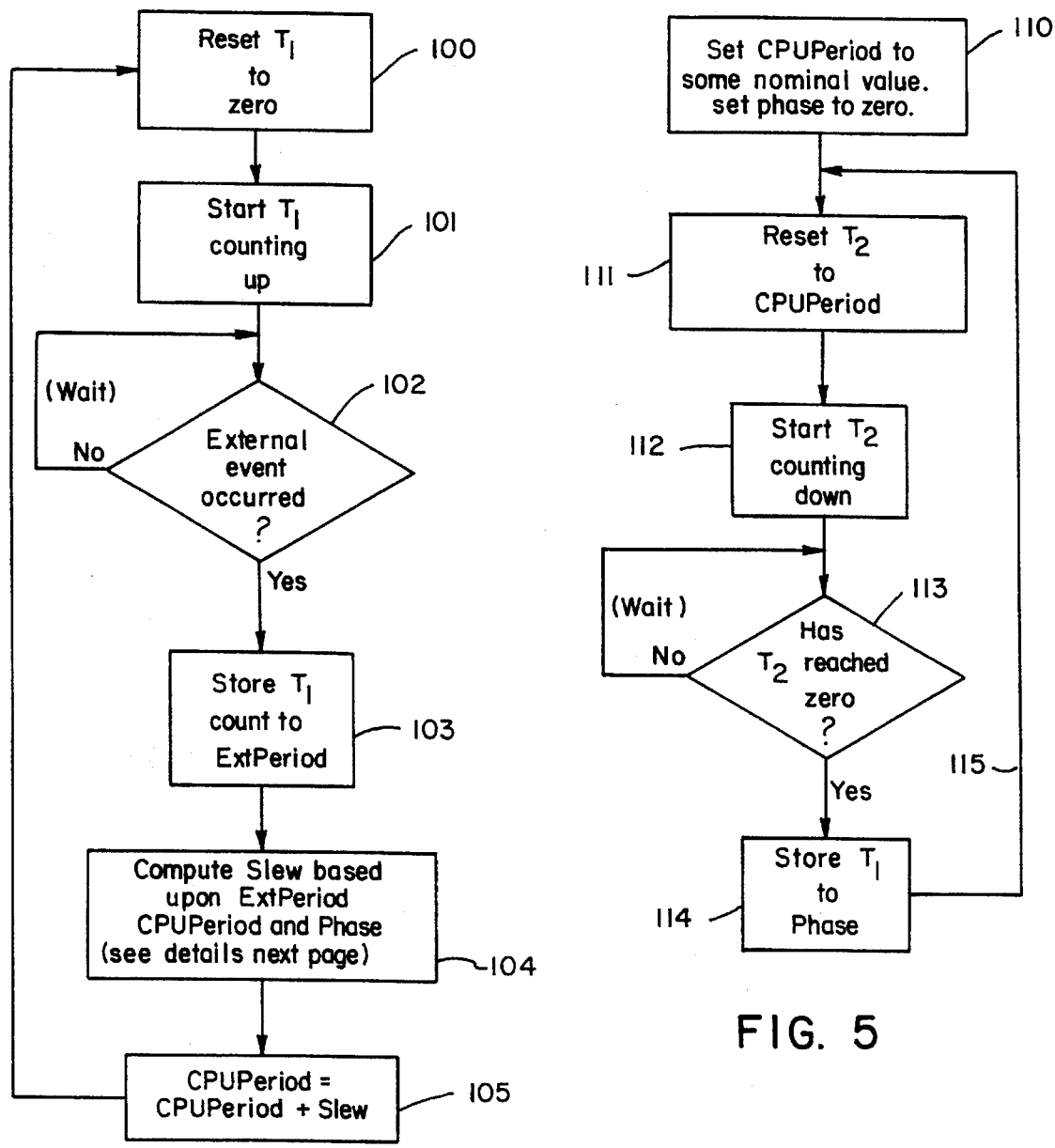
FIG. 4–6 are flowcharts illustrating the steps carried out by the controller in accordance with the invention.
Figure 6:
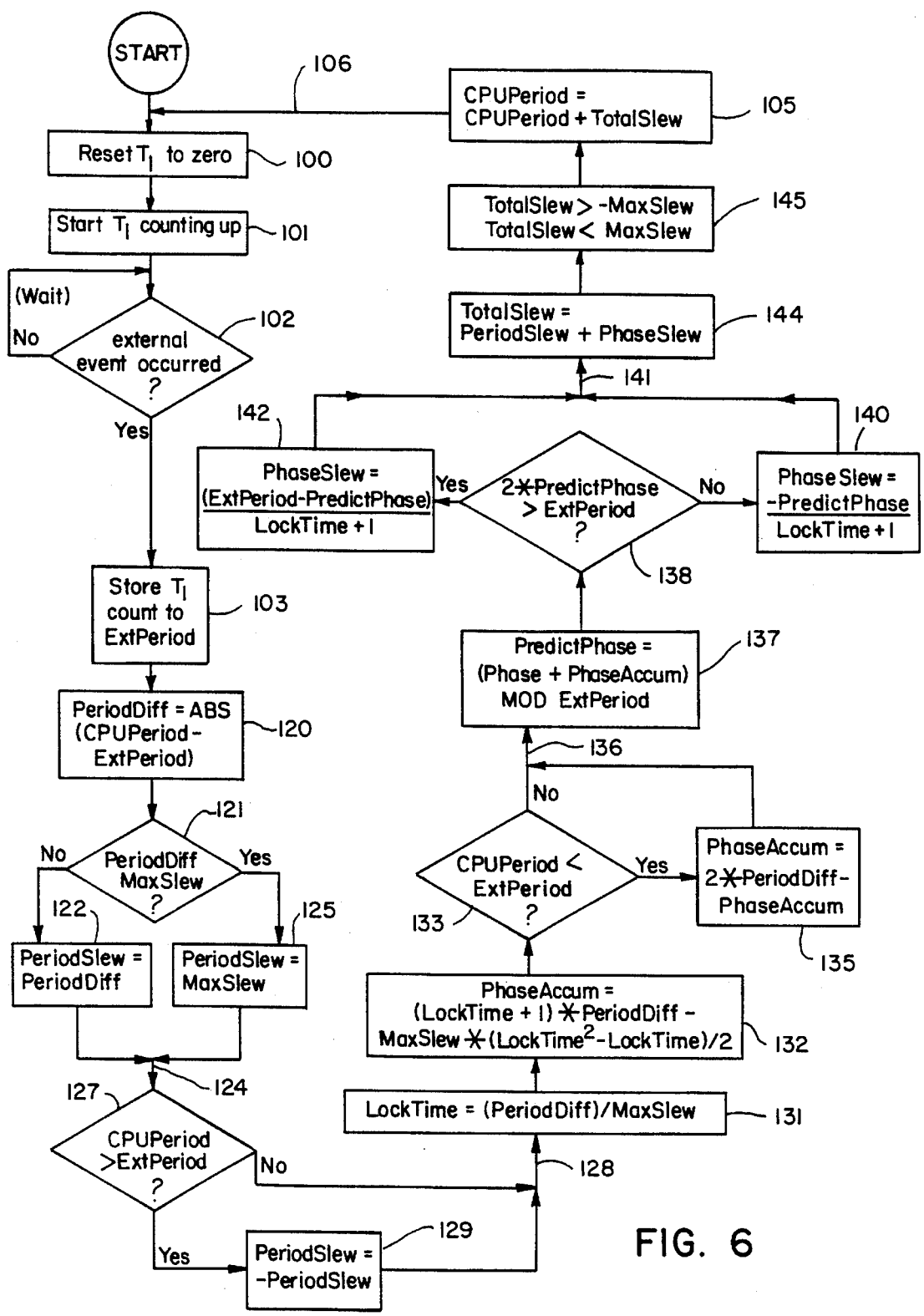

Flow charts showing the computational steps within the processor for carrying out the invention are illustrated in FIGS. 4–6.

With initial reference to FIG. 4, the processor executes a loop which begins at 100 by setting the timer $T_1$ to zero and then starting the timer $T_1$ counting up at 101. At 102, the program continues to cycle waiting until an external event occurs. When the external event R occurs (e.g., a positive zero crossing of the 60 Hz line power reference signal), the count in the timer $T_1$ is stored to the register ExtPeriod at 103. The program then goes on to compute at 104 the TotalSlew based upon ExtPeriod, CPUPeriod and Phase, as described further below with reference to FIG. 6.

The program then proceeds to set the CPUPeriod equal to CPUPeriod+TotalSlew at 105, and returns on a loop 106 back to reset the timer $T_1$ to 0 at 100. This loop cycles continuously in this manner.

With reference to FIG. 5, initialization of variables is carried out at 110 by setting the CPUPeriod to some nominal value and setting Phase equal to zero. The program then proceeds at 111 to reset the timer $T_2$ to CPUPeriod. The program then proceeds to start $T_2$ counting down at 112, and continues cycling at 113, until $T_2$ reaches zero. When $T_2$ reaches zero, the program proceeds at 114 to store the value at that time in $T_1$ to the Phase register and then loops back on the path 115 to the step 111 to repeat the cycle. The processor continues to loop through these steps during the remainder of the program. The value of CPUPeriod is updated in the loop based on the value computed as the program proceeds through the loop of FIG. 4.

A more detailed flow chart of the computations of FIG. 4 is shown in FIG. 6, which includes the steps carried out in the computation step 104 of FIG. 4. As illustrated in FIG. 6, the program cycles through the steps 100, 101, 102 and 103 and then proceeds, after storing the count of $T_1$ to ExtPeriod at 103, to set the PeriodDiff equal to the absolute value of the CPUPeriod minus ExtPeriod at 120. The program then determines at a decision point 121 whether PeriodDiff is greater than MaxSlew. If not, the program at 122 sets PeriodSlew equal to PeriodDiff and proceeds to continue on a path 124; if so, PeriodSlew is set equal to MaxSlew at 125 before the program continues to the path 124. On the path 124, the program then determines at 127 whether CPUPeriod is greater than ExtPeriod. If not, the program proceeds to a path 128; if so, the PeriodSlew is set equal to minus PeriodSlew at 129 before proceeding to the path 128. From the path 128, the program sets LockTime equal to PeriodDiff divided by MaxSlew at 131 and then proceeds to set Phase Accum equal to (LockTime+1)*PeriodDiff– MaxSlew*(LockTime$^2$–LockTime)/2 at 132.

The program then proceeds to determine at 133 whether CPUPeriod is less than ExtPeriod. If yes, PhaseAccum is equal to 2*PeriodDiff–PhaseAccum at 135 before proceeding to a path 136; if not, the program proceeds directly to the path 136. From there, PredictPhase is set equal to (Phase+ PhaseAccum) modulo the ExtPeriod at 137. The program then goes on at 138 to determine whether 2 times Predict-Phase is greater than the ExtPeriod. If not, the program sets PhaseSlew equal to minus PredictPhase/(LockTime+1) at 140 before proceeding to a path 141; if yes, PhaseSlew is set equal to (ExtPeriod–PredictPhase)/(LockTime +1) at 142, before proceeding to the path 141. The program then sets TotalSlew equal to PeriodSlew + PhaseSlew at 144 and then checks to verify that the absolute value of TotalSlew is less than MaxSlew at 145. If this check is not met, TotalSlew is set equal to MaxSlew. The program then proceeds back to step 105 and cycles continuously.

The tables below provide examples of the implementation of the invention. In these examples, time is expressed in number of counts of a timer counting pulses of a clock at 2.5 MHz. The maximum allowed change of period of the controlled signal at each cycle is 347 counts. The variable LinePeriod is the period of the reference signal R (a signal at 60 Hz in each example) and the variable CPUPeriod is the period of the controlled signal C. PeriodDiff is the difference at each cycle between the two periods, Phase is the time difference between the two signals at each cycle, FLT is FreqLock Time as derived above, and the other variables are determined as described above. In each table, the cycles procede in time from right to left, i.e., in Table 1, C-0 is the initial cycle at which measurements are made and C-6 is the later cycle at which phase and frequency lock occur.

TABLE 1

| Variable | C-6 | C-5 | C-4 | C-3 | C-2 | C-1 | C-0 |
|---|---|---|---|---|---|---|---|
| MaxSlew | 347 | 347 | 347 | 347 | 347 | 347 | 347 |
| LinePeriod | 41667 | 41667 | 41667 | 41667 | 41667 | 41667 | 41667 |
| CPUPeriod | 41667 | 41625 | 41856 | 42202 | 42547 | 42881 | 43055 |
| Phase | 0 | 0 | 42 | 41520 | 40985 | 40105 | 38891 |
| PeriodDiff | 0 | –42 | 189 | 535 | aao | 1214 | 1388 |
| FLT | 0 | 0 | 0 | 1 | 2 | 3 | 4 |
| PhaseAccum | 0 | –42 | 189 | 144 | 675 | 1516 | 2082 |
| PredictPhase | 0 | 0 | 42 | 41664 | 41660 | 41621 | 40973 |
| PhaseSlew | 0 | 0 | –42 | 1 | 2 | 13 | 173 |
| PeriodSlew | 0 | 42 | –189 | –347 | –347 | –347 | –347 |
| TotalSlew | 0 | 42 | –231 | –346 | –345 | –334 | –174 |

It is seen that the amount of change in period between cycle C-0 and cycle C-1 is –174, less than the maximum rate of 347 (which can be either positive or negative). For the next three cycles (C-1 through C-3) the change of period for each cycle (TotalSlew) is near the maximum rate but slightly less, because digital variables are calculated rather than continuous variables. After cycle C-3, the PeriodDiff is less than MaxSlew. If the reference and controlled signals were continuous signals (e.g., sine waves) and the period of the controlled signal could be changed continuously, the two signals could be brought to lock in a fraction of a cycle. However, in a discrete system, changes in period can only take place once per cycle, and two cycles are required at less than MaxSlew using the procedure of the invention to bring the signals into lock.

Table 2 below illustrates the process of the invention where the reference signal had an initial period (LinePeriod) of 41667. During the controlled signal cycle C-2, the period of the reference signal was changed abruptly to 40667. Table 3 below illustrates the adaptation of the system to this change in the reference signal.

TABLE 2

| Variable | C-2 | C-1 | C-0 |
|---|---|---|---|
| MaxSlew | 347 | 347 | 347 |
| LinePeriod | 41667 | 41667 | 41667 |
| CPUPeriod | 42547 | 42881 | 43055 |
| Phase | 40985 | 40105 | 38891 |
| PeriodDiff | 880 | 1214 | 1388 |
| FLT | 2 | 3 | 4 |
| PhaseAccum | 675 | 1516 | 2082 |
| PredictPhase | 41660 | 41621 | 40973 |
| PhaseSlew | 2 | 13 | 173 |
| PeriodSlew | –347 | –347 | –347 |
| TotalSlew | –345 | –334 | –174 |

TABLE 3

| Variable | C-9 | C-8 | C-7 | C-6 | C-5 | C-4 | C-3 | C-2 |
|---|---|---|---|---|---|---|---|---|
| MaxSlew | 347 | 347 | 347 | 347 | 347 | 347 | 347 | 347 |
| LinePeriod | 40667 | 40667 | 40667 | 40667 | 40667 | 40667 | 40667 | 40667 |
| CPUPeriod | 40667 | 40632 | 40916 | 41262 | 41609 | 41955 | 42295 | 42547 |
| Phase | 0 | 0 | 35 | 40453 | 39858 | 38916 | 37628 | 36000 |
| PeriodDiff | 0 | −35 | 249 | 595 | 942 | 1288 | 1628 | 1880 |
| PLT | 0 | 0 | 0 | 1 | 2 | 3 | 4 | 5 |
| PhaseAccum | 0 | −35 | 249 | 212 | 807 | 1746 | 3004 | 4152 |
| PredictPhase | 0 | 0 | 35 | 40665 | 40665 | 40662 | 40632 | 40152 |
| PhaseSlew | 0 | 0 | −35 | 1 | 0 | 1 | 7 | 95 |
| PeriodSlew | 0 | 35 | −249 | −347 | −347 | −347 | −347 | −347 |
| TotalSlew | 0 | 35 | −284 | −346 | −347 | −346 | −340 | −252 |

It is understood that the invention is not confined to the particular embodiments set forth herein as illustrative, but embraces all such modified forms thereof as come within the scope of the following claims.

What is claimed is:

1. A method for obtaining phase and frequency locking of a controlled signal to a reference signal comprising the steps of:

(a) measuring the time difference in the periods of the reference signal and the controlled signal at a cycle of the controlled-signal;

(b) measuring the time difference in the phases of the reference signal and the controlled signal at the cycle of the controlled signal;

(c) given a selected maximum amount of time that the period of the controlled signal is allowed to change between each cycle of the controlled signal, determining predicted changes of period to bring the controlled signal into phase and frequency lock with the reference signal such that the direction and amount of change in the period of the controlled signal during at least the next cycle at which the period is changed is selected such that for subsequent changes in period of the controlled signal to bring it into phase and frequency lock, the change in period would be at the maximum amount of time that can be changed per cycle; and (d) changing the period of the next cycle of the controlled signal in accordance with the predicted change so determined.

2. The method of claim 1 wherein the steps of measuring the time difference in the periods and phases are carried out at each cycle of the controlled signal and the step of determining predicted changes of period is carried out at each cycle of the controlled signal, and the period of the controlled signal is changed at the next cycle in accordance with the new predicted change so determined.

3. The method of claim 1 wherein in the steps of measuring the periods of the reference signal and the controlled signal, the time difference in periods and the time difference in phases are measured in terms of the numbers of counts by timers of a clock signal and wherein the predicted changes to obtain phase and frequency lock are determined as follows:

where $T_S$ is the total number of counts to add to or subtract from the period of the controlled signal at each cycle in the sequence, $T_S = P_{s1} + P_S$ at the first cycle if $(P_{s1} + P_S) \leq M_S$, and then $T_S = M_S$ for all subsequent cycles until phase and frequency lock is obtained, and wherein $M_S$ is the maximum count that may be subtracted from or added to the period of the controlled signal in one cycle, $P_S = -D_F \cdot P_P (L_{TI} + 1)$, $P_P = (P_0 + P_A)) \bmod E_P$, $P_{s1} = D_F \cdot P_D$ if $P_{s1} < M_s$, otherwise $P_{s1} = M_s$, $P_D$ = the magnitude of the difference between the period $E_P$ of the reference signal and the period $C_P$ of the controlled signal measured in timer counts, such that $P_D = E_P - C_P$, $D_F$ is the direction in which to slew, such that $D_F = +1$ if $E_P > C_P$, and $D_F = -1$ if $E_P \leq C_P$, $L_T = P_D / M_S$, $L_{TI}$ = the integer part of $L_T$, and $L_{TR}$ = the remainder of $L_T$, such that $L_T = L_{TI} + L_{TR} / M_S$, $P_0$ = the initial phase difference between the reference signal and the controlled signal measured in timer clock counts, and either $P_A = -D_F [P_D(L_{TI}+1) - M_S (L_{TI}+1)L_{TI}/2]$ or $P_A = -D_F [M_S(L_{TI}+1) - L_{TI}/2 + L_{TR} (L_{TI}+1)]$.

4. A method for obtaining phase and frequency locking of a controlled signal to a reference signal comprising the steps of:

(a) measuring the time difference in the periods of the reference signal and the controlled signal at each cycle of the controlled signal;

(b) measuring the time difference in the phases of the reference signal and the controlled signal at each cycle of the controlled signal;

(c) given a selected maximum amount of time that the period of the controlled signal is allowed to change between each cycle of the controlled signal, at each cycle of the controlled signal determining predicted changes of period to bring the controlled signal into phase and frequency lock with the reference signal such that the direction and amount of change in the period of the controlled signal during at least the next cycle at which the period is changed is selected such that for subsequent changes in period of the controlled signal to bring it into phase and frequency lock, the change in period would be at the maximum amount of time that can be changed per cycle; and (d) changing the period of the next cycle of the controlled signal in accordance with the predicted change so determined; and then (e) repeating steps (a) through (d) for each new cycle of the controlled signal.

5. The method of claim 4 wherein in the steps of measuring the periods of the reference signal and the controlled signal, the time difference in periods and the time difference in phases are measured in terms of the numbers of counts by timers of a clock signal and wherein the predicted changes to obtain phase and frequency lock are determined as follows:

where $T_S$ is the total number of counts to add to or subtract from the period of the controlled signal at each cycle in the sequence, $T_S=P_{s1}+P_S$ at the first cycle if $(P_{s1}+P_S) \leq M_S$, and then $T_S=M_S$ for all subsequent cycles until phase and frequency lock is obtained, and wherein $M_S$ is the maximum count that may be subtracted from or added to the period of the controlled signal in one cycle, $P_S = -D_F \cdot P_P (L_{TI}+1)$, $P_P = (P_0+P_A)$ Mod $E_P$, $P_{s1} = D_F \bullet P_D$ if $P_{s1} < M_s$, otherwise $P_{s1} = M_s$, $P_D$ = the magnitude of the difference between the period $E_P$ of the reference signal and the period $C_P$ of the controlled signal measured in timer counts, such that $P_D = E_P - C_P$, $D_F$ is the direction in which to slew, such that $D_F = +1$ if $E_P > C_P$, and $D_F = -1$ if $E_P \leq C_P$, $L_T = P_D/M_S$, $L_{TI}$ = the integer part of $L_T$, and $L_{TR}$ = the remainder of $L_T$, such that $L_T = L_{TI} + L_{TR}/M_S$, $P_0$ = the initial phase difference between the reference signal and the controlled signal measured in timer clock counts, and either $P_A = -D_F [P_D(L_{TI}+1) - M_S (L_{TI}+1)L_{TI}/2]$ or $P_A = -D_F [M_S(L_{TI}+1) - L_{TI}/2 + L_{TR}(L_{TI}+1)]$.

6. Apparatus for obtaining phase and frequency locking to a reference signal comprising:

(a) controlled signal generator means for providing a controlled signal that can be adjusted in phase and frequency;

(b) means for measuring the time difference in the periods of the reference signal and the controlled signal at each cycle of the controlled signal, means for measuring a the time difference in the phases of the reference signal and the controlled signal at each cycle of the controlled signal, and given a selected maximum amount of time that the period of the controlled signal is allowed to change between each cycle of the controlled signal, means for determining predicted changes of period to bring the controlled signal into phase and frequency lock with the reference signal such that the direction and amount of change in the period of the controlled signal during at least the next cycle at which the period is changed is selected such that for subsequent changes in period of the controlled signal to bring it into phase and frequency lock, the change in period will be at the maximum amount of time that can be changed per cycle; and (c) means for changing the period of the next cycle of the controlled signal provided from the controlled signal generator means in accordance with the predicted change so determined at each new cycle of the controlled signal to bring the controlled signal into phase and frequency coherence with the reference signal.

7. The apparatus of claim 6 wherein the means for measuring the time difference in periods and the time difference in phases of the reference signal and the controlled signal includes timers and a clock providing a clock signal, and wherein the periods are measured in terms of the numbers of counts by the timers of the clock signal, and wherein the predicted changes to obtain phase and frequency lock are determined by the controller as follows:

where $T_S$ is the total number of counts to add to or subtract from the period of the controlled signal at each cycle in the sequence, $T_S=P_{s1}+P_S$ at the first cycle if $(P_{s1}+P_S) \leq M_S$, and then $T_S=M_S$ for all subsequent cycles until phase and frequency lock is obtained, and wherein $M_S$ is the maximum count that may be subtracted from or added to the period of the controlled signal in one cycle, $P_S = -D_F \cdot P_P (L_{TI}+1)$, $P_P = (P_0+P_A)$ Mod $E_P$, $P_{s1} = D_F \bullet P_D$ if $P_{s1} < M_s$, otherwise $P_{s1} = M_s$, $P_D$ = the magnitude of the difference between the period $E_P$ of the reference signal and the period $C_P$ of the controlled signal measured in timer counts, such that $P_D = E_P - C_P$, $D_F$ is the direction in which to slew, such that $D_F = +1$ if $E_P > C_P$, and $D_F = -1$ if $E_P \leq C_P$, $L_T = P_D/M_S$, $L_{TI}$ = the integer part of $L_T$, and $L_{TR}$ = the remainder of $L_T$, such that $L_T = L_{TI} + L_{TR}/M_S$, $P_0$ = the initial phase difference between the reference signal and the controlled signal measured in timer clock counts, and either $P_A = -D_F [P_D(L_{TI}+1) - M_S (L_{TI}+1)L_{TI}/2]$ or $P_A = -D_F [M_S(L_{TI}+1) - L_{TI}/2 + L_{TR}(L_{TI}+1)]$.

8. An uninterruptible power supply comprising:

(a) an auxiliary power supply battery;

(b) power transfer means including an inverter, connected to the auxiliary power supply battery and to AC line power, for responding to control signals to provide power to an AC output from either the AC line power or from the battery through the inverter;

(c) a controller which provides control signals to the power transfer means, the controller including controlled signal generator means for providing a controlled signal that can be adjusted in phase and frequency, means for measuring the time difference in the periods of the AC line power as a reference signal and the controlled signal at each cycle of the controlled signal, a selected point in time, means for measuring the time difference in the phases of the reference signal and the controlled signal at the selected point in time, and given a selected maximum amount of time that the period of the controlled signal is allowed to change between each cycle of the controlled signal, means for determining predicted changes of period to bring the controlled signal into phase and frequency lock with the reference signal such that the direction and amount of change in the period of the controlled signal during at least the next cycle at which the period is changed is selected such that for subsequent changes in period of the controlled signal to bring it into phase and frequency lock with the reference signal, the change in period will be at the maximum amount of time that can be changed per cycle, means for changing the period of the next cycle of the controlled signal provided from the controlled signal generator means in accordance with the predicted change so determined during each new cycle of the controlled signal to bring the controlled signal into phase and frequency coherence with the reference signal, and further including means for controlling the power transfer means when a fault has occurred in AC line power to provide AC power derived from the battery through the inverter to the AC output, the AC output power being provided from the inverter at the phase and frequency of the controlled signal provided from the controlled signal generator means.

9. The uninterruptible power supply of claim 8 wherein the controller further includes means for causing the power transfer means to switch from providing power from the battery to the AC output to providing AC line power to the AC output when AC line power has been restored at the AC input lines, and wherein the controlled signal is brought into phase and frequency coherence with the restored AC line power as the reference signal.

10. The uninterruptible power supply of claim 8 wherein the means for measuring the time difference in periods and the time difference in phases of the reference signal and the controlled signal includes timers and a clock providing a clock signal, and wherein the periods are measured in terms of the numbers of counts by the timers of the clock signal, and wherein the predicted changes to obtain phase and frequency lock are determined by the controller as follows:

where $T_S$ is the total number of counts to add to or subtract from the period of the controlled signal at each cycle, $T_S = P_{s1} + P_S$ at the first cycle if $(P_{s1}+P_S) \leq M_S$, and then $T_S = M_S$ for all subsequent cycles until phase and frequency lock is obtained, and wherein $M_S$ is the maximum count that may be subtracted from or added to the period of the controlled signal in one cycle, $P_S = -D_F \cdot P_P (L_{TI}+1)$, $P_P = (P_0 + P_A)$ Mod $E_P$, $P_{s1} = D_F \bullet P_D$ if $P_{s1} < M_s$, otherwise $P_{s1} = M_s$, $P_D$ = the magnitude of the difference between the period $E_P$ of the reference signal and the period $C_P$ of the controlled signal measured in timer counts, such that $P_D = E_P - C_P$, $D_F$ is the direction in which to slew, such that $D_F = +1$ if $E_P > C_P$, and $D_F = -1$ if $E_P \leq C_P$, $L_T = P_D / M_S$, $L_{TI}$ = the integer part of $L_T$, and $L_{TR}$ = the remainder of $L_T$, such that $L_T = L_{TI} + L_{TR}/M_S$, $P_0$ = the initial phase difference between the reference signal and the controlled signal measured in timer clock counts, and either $P_A = -D_F [P_D(L_{TI}+1) - M_S (L_{TI}+1)L_{TI}/2]$ or $P_A = -D_F [M_S (L_{TI}+1) - L_{TI}/2 + L_{TR} (L_{TI}+1)]$.

\* \* \* \* \*